(12) United States Patent
Fukuda

(10) Patent No.: US 9,997,900 B2
(45) Date of Patent: Jun. 12, 2018

(54) PROTECTING CAP FOR TERMINAL CONSOLIDATION SPLICE

(71) Applicant: Sumitomo Wiring Systems, Ltd., Yokkaichi, Mie (JP)

(72) Inventor: Takao Fukuda, Mie (JP)

(73) Assignee: Sumitomo Wiring Systems, Ltd., Yokkaichi, Mie (JP)

(*) Notice: Subject to any disclaimer, the term of this patent is extended or adjusted under 35 U.S.C. 154(b) by 0 days. days.

(21) Appl. No.: 15/534,574

(22) PCT Filed: Dec. 1, 2015

(86) PCT No.: PCT/JP2015/083750
§ 371 (c)(1),
(2) Date: Jun. 9, 2017

(87) PCT Pub. No.: WO2016/098580
PCT Pub. Date: Jun. 23, 2016

(65) Prior Publication Data
US 2017/0346270 A1 Nov. 30, 2017

(30) Foreign Application Priority Data
Dec. 19, 2014 (JP) .................................. 2014-257965

(51) Int. Cl.
H01B 17/38 (2006.01)
H01R 4/22 (2006.01)
H02G 15/04 (2006.01)

(52) U.S. Cl.
CPC ........... *H02G 15/043* (2013.01); *H01B 17/38* (2013.01); *H01R 4/22* (2013.01)

(58) Field of Classification Search
CPC ........ H02G 15/043; H02G 15/02; H02G 1/14; H01B 17/38; H01B 17/56; H01B 7/00; H01B 7/282; H01R 4/22; H01R 4/70
(Continued)

(56) References Cited

U.S. PATENT DOCUMENTS 4,751,350 A * 6/1988 Eaton .................... H02G 15/043
174/74 A
5,589,666 A * 12/1996 DeCarlo .................. H02G 1/14
156/48
(Continued)

FOREIGN PATENT DOCUMENTS

JP    H053054 A    1/1993
JP    H08130045 A  5/1996
(Continued)

OTHER PUBLICATIONS

International Search Report and Written Opinion for Application No. PCT/JP2015/083750 dated Feb. 16, 2016, 6 pages.
(Continued)

Primary Examiner — Timothy Thompson
Assistant Examiner — Michael F McAllister
(74) Attorney, Agent, or Firm — Reising Ethington, P.C.

(57) ABSTRACT

A water proofing protecting cap that is placed over a terminal consolidation splice portion of a wire harness. The protecting cap being a dip molded transparent tubular body that is provided with a bottom portion wherein, from an opening for insertion at the other end, the protecting cap can be filled with a water sealant and a terminal consolidation splice portion of a wire harness is insertable. A marking line made by a rib on a male mold used in the dip molding is provided in a circumferential direction on an inner circumferential surface of a peripheral wall and is distanced by a required height from an inner surface of the bottom portion toward the opening, and a non-transparent line is provided on an outer circumferential surface of the peripheral wall following the marking line. The non-transparent line serving as a control line for a lower end position of the consolidation splice portion.

5 Claims, 4 Drawing Sheets

(58) Field of Classification Search
USPC .................................................... 174/138 F
See application file for complete search history.

(56) References Cited

U.S. PATENT DOCUMENTS

| | | | |
|---|---|---|---|
| 5,895,890 A | 4/1999 | Uchiyama | |
| 5,901,441 A | 5/1999 | Kawamura | |
| 6,156,976 A * | 12/2000 | Kawamura | H01R 4/22 174/76 |
| 7,299,548 B2 * | 11/2007 | Torii | H01R 13/5216 174/74 A |
| 9,559,435 B2 * | 1/2017 | Joye | H01R 4/20 |
| 2004/0253857 A1 * | 12/2004 | Sakaguchi | H01R 4/20 439/134 |
| 2009/0283293 A1 * | 11/2009 | Hiner | H01R 4/22 174/87 |
| 2010/0048051 A1 * | 2/2010 | Melni | H01R 4/56 439/271 |

FOREIGN PATENT DOCUMENTS

| | | |
|---|---|---|
| JP | H1083845 A | 3/1998 |
| JP | H10149844 A | 6/1998 |
| JP | 2000324671 A | 11/2000 |
| JP | 2008131327 A | 6/2008 |

OTHER PUBLICATIONS

International Search Report for Application No. PCT/JP2015/083750 dated Feb. 5, 2016, 4 pages.

* cited by examiner

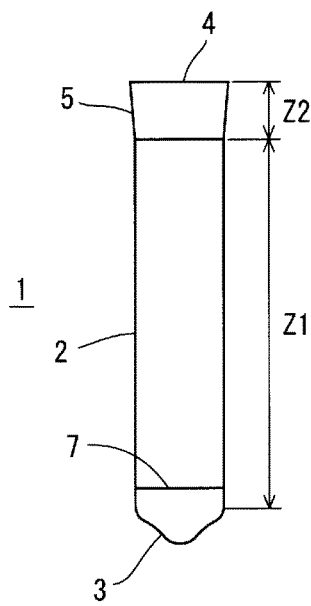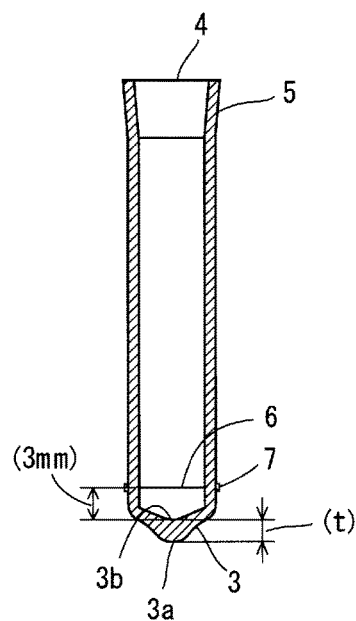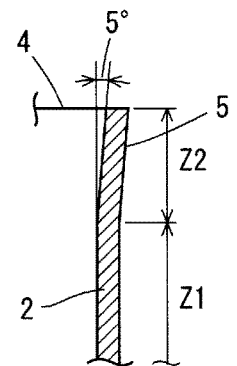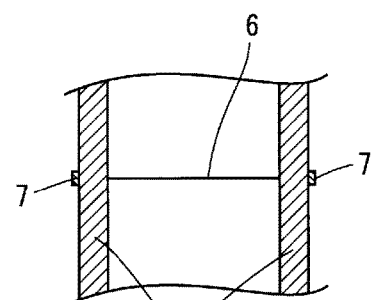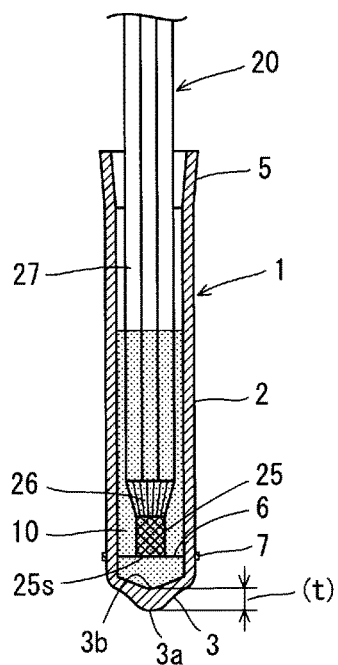

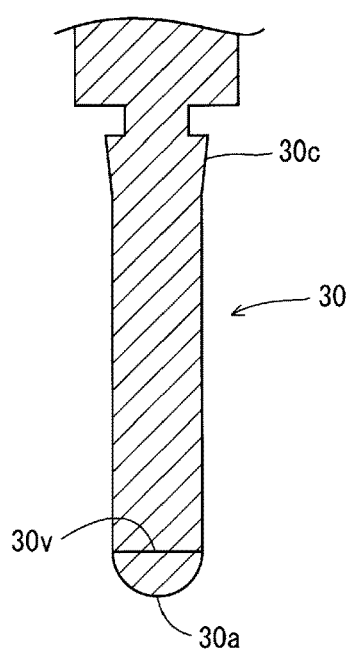
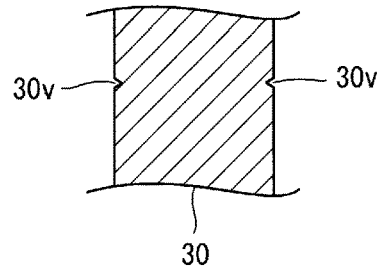
Fig. 3A
Fig. 3B
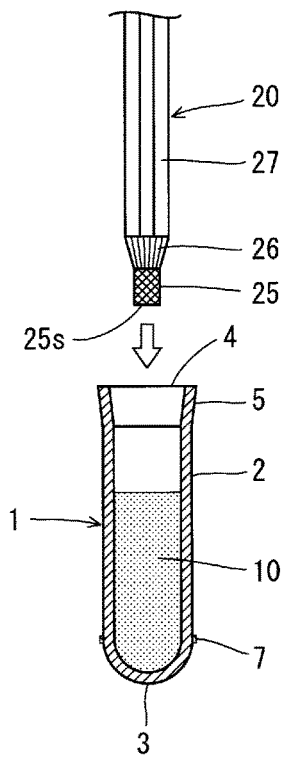
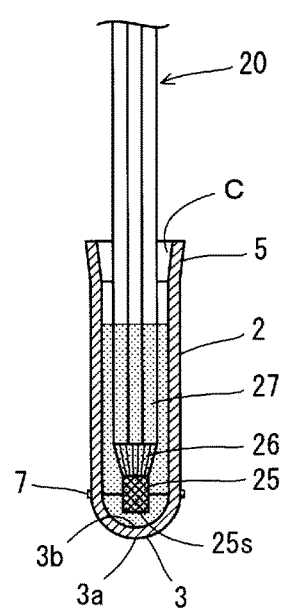
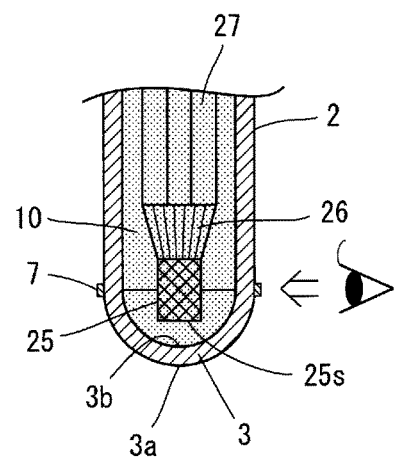
Fig. 4A
Fig. 4B
Fig. 4C

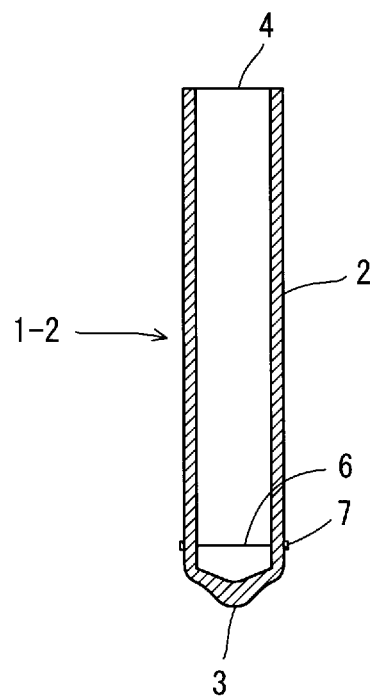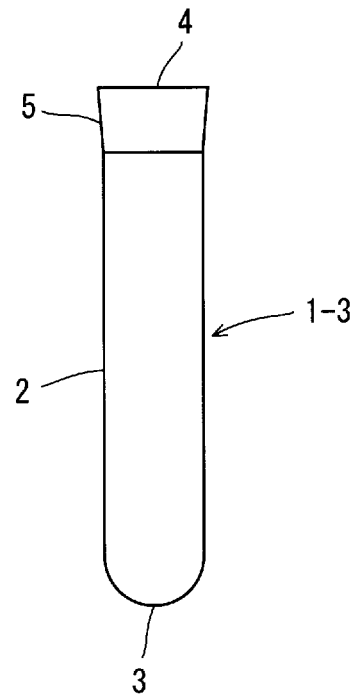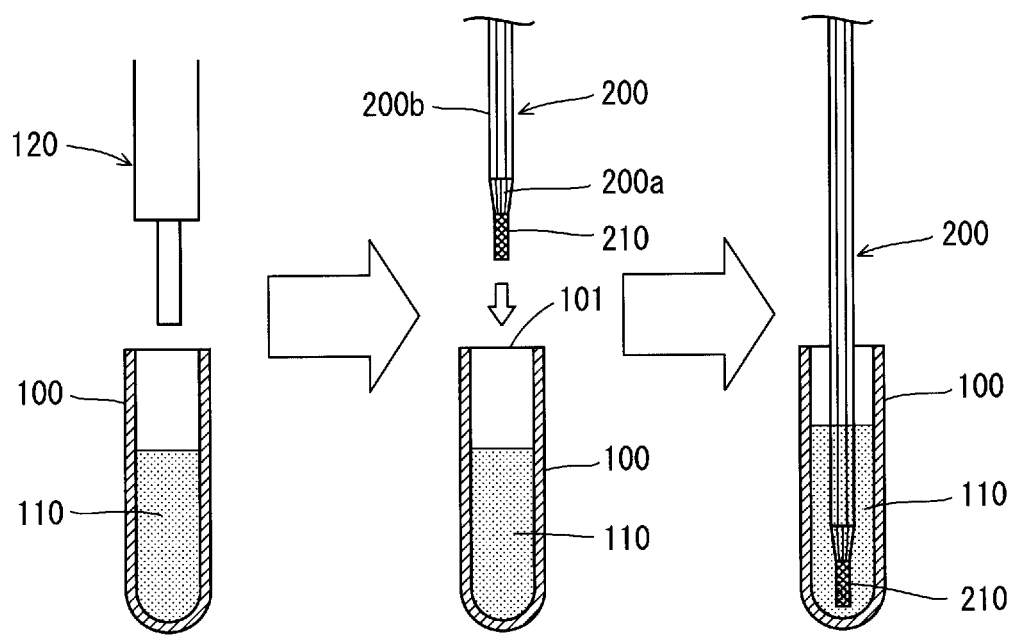

*Fig. 7*
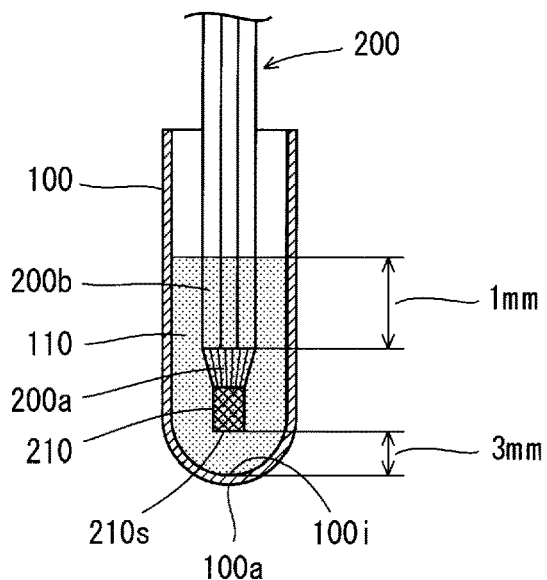
*Fig. 8A*
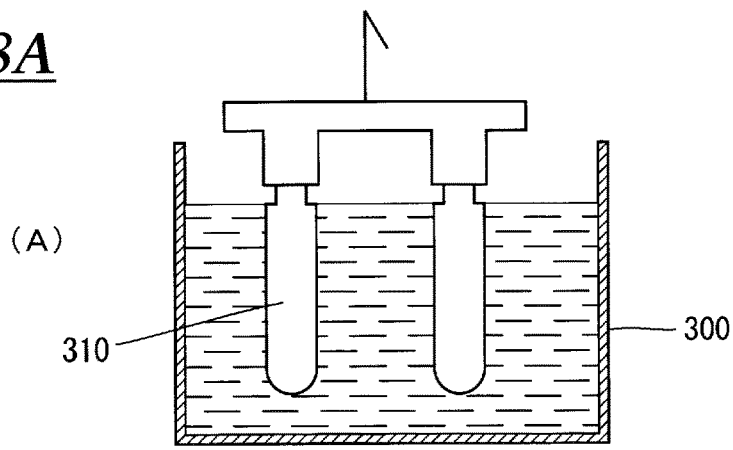
*Fig. 8B*    *Fig. 8C*
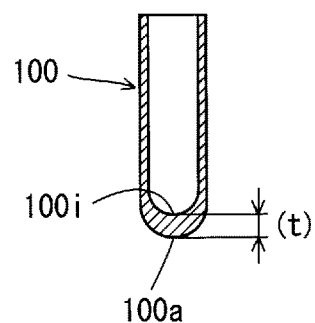    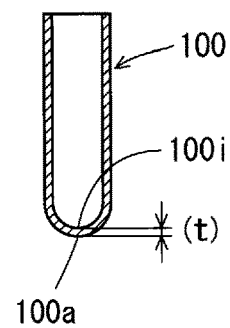

PROTECTING CAP FOR TERMINAL CONSOLIDATION SPLICE

CROSS REFERENCE TO RELATED APPLICATIONS

This application claims the priority of Japanese patent application JP2014-257965 filed on Dec. 19, 2014, the entire contents of which are incorporated herein.

TECHNICAL FIELD

The present invention relates to a protecting cap for a terminal consolidation splice, and particularly to a protecting cap that is placed over a terminal consolidation splice, which is formed by welding or crimping together electrical wire terminals of core wires of a plurality of electrical wires in a wire harness, for insulation protection and waterproofing, in which the filling amount of water sealant filled into the protecting cap can be easily checked and water sealant can be reliably prevented from spilling out.

BACKGROUND ART

Of the many electrical wires that constitute a wire harness, the plurality of electrical wires that require circuit connection are stripped of their sheathed portion at their electrical wire terminals, and the exposed core wires are resistance welded, ultrasonically welded, or crimped together to form a terminal consolidation splice (hereinafter referred to as "splice portion"). Insulation protection is required because a short circuit occurs when the splice portion comes into contact with another conductive material, and water sealing processing is required because corrosion occurs if water adheres to the splice portion, particularly if the splice portion is to be arranged in a submersion area. As shown in FIG. 6, the protecting cap is a bottomed tubular protecting cap 100 that is made of resin, and is filled in advance with a melted water sealant 110 using a nozzle 120, then a terminal consolidation splice 210 of a wire harness 200 is inserted into the protecting cap 100 via an insertion hole 101, and the water sealant 110 is cured. (see JP 2000-324671A and Japanese Patent JP 2008-313846A).

In the protecting cap filled with the water sealant, there is a need to reliably submerge in the water sealant 110 a required range including the splice portion 210, a stripped portion 200a that is continuous with the splice portion 210, and a sheathed portion 200b that is continuous with the stripped portion. For this reason, the filling amount of the water sealant 110 is set based on the relation between the size of the protecting cap 100 (cross-section surface area and length) and the volume of the splice portion 210, the stripped portion 200a, and the sheathed portion 200b.

As shown in FIG. 7, as specific criteria, it is necessary to position a tip surface 210s of the splice portion 210 within 3 mm from an inner surface 100i of a closed bottom 100a of the protecting cap 100, and to submerge at least 1 mm of the sheathed portion 200b with the water sealant 110.

If the splice portion 210 is inserted into the protecting cap 100 that has been filled with the water sealant 110 in advance, the splice portion 210 is likely to float up due to the water sealant 110. Thus, there are cases where the splice portion 210 is distanced from the closed bottom 100a of the protecting cap 100, and the required range of the sheathed portion 200b is not submerged in the water sealant. Also, if the volume of the splice portion 210, the stripped portion 200a, and the sheathed portion 200b of the electrical wire group that is continuous with the splice portion inserted into the protecting cap 100 changes even marginally, the level of the water sealant 110 that has been filled into the protecting cap 100 changes, and there is the concern that the water sealant will spill out from the insertion hole 101 in the protecting cap 100 and liquid leakage will occur.

Accordingly, even if the protecting cap 100 is filled with a set amount of the water sealant 110, after the splice portion 210 has been inserted into the protecting cap 100 and the water sealant has cured, there is a need to examine the manufactured product as to whether the above-described range including the splice portion 210 and the like is submerged in the water sealant 110. For this reason, conventionally, a worker used to apply a ruler to the outside thereof and perform an examination.

SUMMARY

As described above, the work of using a ruler for measurement and examination is troublesome and variations may occur between workers. Also, while it is preferable to perform a visual observation from the outside, the protecting cap 100 is conventionally molded using a transparent resin, and there are many cases where a transparent two liquid reactive curing type epoxy resin is used as the water sealant 110. Specifically, if both the protecting cap 100 and the water sealant 110 are transparent, there is the issue of it being difficult to visually confirm the position of the inner surface (upper surface) 100i of the closed bottom 100a of the protecting cap 100 and the liquid level of the water sealant 110, from the outside.

Furthermore, the protecting cap 100 has merits including reducible production costs, and thus there have been cases in recent years of dip molding, such as that shown in FIG. 8A, being performed. Specifically, a male mold 310 that has been immersed in a melted resin such as vinyl chloride in a storage tank 300 is lifted out and is then heated, cooled, and released from the mold to form the protecting cap 100. In the dip molded protecting cap 100 shown in FIGS. 8B and 8C, it is difficult to control a thickness (t) of the closed bottom 100a at the tip thereof, and therefore variation may occur in the thickness (t).

As described above, it is difficult to visually confirm a position of the inner surface (upper surface) 100i of the closed bottom from the outside, and therefore the height from the outer surface (lower surface) of the closed bottom 100a to the tip surface 210s of the splice portion 210 is measured from the outside, but the height from the inner surface 100i of the closed bottom to the tip surface 210s of the splice portion cannot be accurately obtained based on the measurement value.

The present design has been made in light of the problems described above, in which a first problem to be solved is making it possible to easily and accurately confirm an examination position in a dip molded protecting cap in which variation in the thickness of the closed bottom is likely to occur.

Also, a second problem to be solved is making it possible to avoid liquid leakage in which water sealant filled into the protecting cap spills out in a state where a splice portion has been inserted.

A protecting cap for a terminal consolidation splice is provided as a first embodiment for solving the problems described above, the protecting cap being a dip molded transparent tubular body that is provided with a bottom portion at one end of the tubular body in a length direction thereof, wherein, from an opening for insertion at the other end, the protecting cap can be filled with a water sealant and a terminal consolidation splice portion of a wire harness is insertable.

A marking line made by a rib on a male mold used in the dip molding is provided in a circumferential direction on an inner circumferential surface of a peripheral wall and is distanced by a required height from an inner surface of the bottom portion toward the opening, and a non-transparent line is provided on an outer circumferential surface of the peripheral wall following the marking line, the non-transparent line serving as a control line for a lower end position of the consolidation splice portion.

In the dip molded protecting cap, while the accuracy of a thickness (t) of the bottom portion and the outer surface of the bottom portion cannot be increased, the inner surface of the bottom portion is molded as a mold surface of the lower end surface of the male mold, and the position of a marking line can be accurately provided using the mold, on the inner circumferential surface of the peripheral wall distanced by a set height from the inner surface of the bottom portion. Since the marking line formed on the inner circumferential surface of the peripheral wall is a transparent rib and as such cannot be visually confirmed from the outside, a configuration is employed in which a non-transparent control line is provided on the outer circumferential surface at a position that corresponds to the marking line such that it can be reliably visually observed from the outside.

As described above, when using a protecting cap to which a control line that can be visually observed from the outside has been attached, if the position of the lower end of the consolidation splice portion is at a position at or below the control line on the bottom portion side, it is possible to perform an external visual observation and examination as to whether the consolidation splice portion and the stripped portion of the electrical wires that are continuous with the consolidation splice portion, as well as a required range of the insulating sheathed portion that is continuous with the stripped portion have been submerged in the water sealant. In other words, if the position of the lower end of the consolidation splice portion has floated up past the control line and is on the opening side, it can be determined that the necessary portions have not been submerged in the water sealant and that the product is defective. In this way, a defective product can be easily and accurately determined through an external visual examination.

If the water sealant that is filled into the protecting cap is transparent, the present design can be used favorably. Specifically, if the water sealant that is filled into a transparent protecting cap is transparent, it is difficult to visually confirm a boundary between the inner surface of the bottom portion of the protecting cap and the lower surface of the water sealant from the outside, and thus when a non-transparent control line is provided in advance, suitable and defective products can be determined at a glance by using the control line as a reference.

It is preferable that the non-transparent control line provided on the outer circumferential surface of the peripheral wall is marked by a laser marker or ink as a line that goes entirely or partially around the outer circumferential surface of the peripheral wall at a position that is 2.5 mm to 3.5 mm from the inner surface of the bottom portion.

Specifically, the control line is provided on the peripheral wall at a position 3 mm from the inner surface of the bottom portion. If the bottom end of the consolidation splice portion is located at a position 3 mm or less from the inner surface of the bottom portion, the entirety of the consolidation splice portion and the stripped portion and at least 1 mm of the insulating sheathed portion is guaranteed to be submerged in the water sealant.

The size of the protecting cap has a different cross-sectional surface area and length according to the external shape of the inserted consolidation splice portion, stripped portion, and insulating sheathed portion. For example, assuming a length of 40 mm and a diameter of 8 mm, the control line is provided at a position that is 3 mm from the inner surface of the bottom portion, as described above.

Note that the externally visually observable control line is not limited to the case of molding using dip molding, and it goes without saying that the control line may be provided on a protecting cap that is a transparent protecting cap to be filled with water sealant.

Also, a protecting cap for a terminal consolidation splice is provided as a second embodiment, the protecting cap being a resin molded tubular body that is provided with a bottom portion at one end of the tubular body in a length direction thereof, wherein, from an opening for insertion at the other end, the protecting cap can be filled with a water sealant and a terminal consolidation splice portion of a wire harness is insertable.

A peripheral wall extends straight in the length direction from the bottom portion to a vicinity of the opening, and an enlarged diameter portion that widens to incline in a range of 3 to 6 degrees toward the opening in the peripheral wall is provided in the vicinity of the opening, a gap being formed between an inner surface of the enlarged diameter portion and an outer circumferential surface of an insulating sheathed portion of the wire harness, to prevent the water sealant from reaching the opening due to capillary action.

It is preferable that the enlarged diameter portion provided in a vicinity of the opening of the protecting cap is provided over a range of 5% to 15% of the entire length of the protecting cap from the opening. Specifically, for example, assuming that the protecting cap has a length of 40 mm, it is preferable that the enlarged diameter portion is 4 mm, which is 10% of the entire length of the protecting cap, and that the incline angle of the enlarged diameter portion is at 5 degrees.

The protecting cap according to the second embodiment is not limited to a dip molded protecting cap, and an injection molded protecting cap can also be also favorably applied.

A two liquid curing type epoxy resin is used as the water sealant, and the dip molded protecting cap is made of vinyl chloride, polyethylene, nylon, silicone resin, or the like.

Employing a protecting cap that has a control line for water sealant, which is in the dip molded protecting cap according to the first embodiment, and is provided with an enlarged diameter portion for preventing the water sealant from leaking out, due to capillary action, on the insertion opening side according to the second embodiment is favorable in terms of production cost and performance.

Because the water sealant is filled into the dip molded protecting cap that is colorless and transparent, it is hard to visually observe the portion filled by water sealant from the outside, and variation in the thickness of the bottom portion of the protecting cap is likely to occur, and therefore it is hard to confirm the position of the lower end of the splice portion from the inner surface of the bottom portion. However, in the protecting cap according to the first embodiment, a control line that is non-transparent is marked at the required position from the inner surface of the bottom portion, and therefore suitable and defective products can be determined at a glance by a worker, from the outside, using the control line as a reference to compare it with the position of the lower end of the splice portion.

Also, in the protecting cap according to the second embodiment, because an enlarged diameter portion is provided in the peripheral wall on the opening side and a gap widens between the enlarged diameter portion and the outer circumference of the inserted wire harness, movement of the water sealant due to capillary action that results in spilling out from the opening can be prevented.

BRIEF DESCRIPTION OF DRAWINGS

FIG. 1 shows an embodiment of a protecting cap according to the present design, where FIG. 1A is a front side view, FIG. 1B is a cross-sectional view, and FIGS. 1C and 1D are enlarged cross-sectional views of a major component;

FIG. 2 is a cross-sectional view showing a state where a water sealant and a splice portion are inserted into the protecting cap;

FIG. 3 shows a male mold used in dip molding, where FIG. 3A is a cross-sectional view and FIG. 3B is an enlarged view of a major component in FIG. 3A;

FIGS. 4A, 4B, and 4C are diagrams of process steps for inserting the splice portion inserted into the protecting cap and the state of visual examination;

FIGS. 5A and 5B are diagrams showing variations;

FIG. 6 is a diagram showing conventional process steps;

FIG. 7 is a diagram illustrating a required level of the water sealant in the protecting cap; and FIG. 8A is a schematic diagram showing a state of dip molding the protecting cap, and FIGS. 8B and 8C are cross-sectional diagrams of dip molded protecting caps.

DESCRIPTION OF EMBODIMENTS

Embodiments of the present design will be described below with reference to the diagrams.

FIGS. 1 to 4C show a protecting cap according to a first embodiment.

A protecting cap 1 is a dip molded tubular body that is colorless and transparent, to which a bottom portion 3 is provided at one end in the length direction of a peripheral wall 2 of the tubular body, and an opening 4 for insertion is provided at the other end. The peripheral wall 2 has an annular cross section, and with a region Z1 from the bottom portion 3 to the vicinity of the opening 4 being a straight tube with the same cross-sectional shape, a region Z2 from the upper end of the region Z1 in FIG. 1A to the opening 4 is an enlarged diameter portion 5 that widens towards the opening.

As shown in FIG. 2, a colorless and transparent water sealant 10 is filled into the protecting cap 1 and a terminal consolidation splice portion 25 (hereinafter referred to as "splice portion 25") provided at the terminals of a wire harness 20 is inserted therein. The splice portion 25, a stripped portion 26 of the plurality of electrical wires that are continuous with the splice portion 25, and an insulating sheathed portion 27 of the electrical wires that are continuous with the stripped portion 26 are submerged in the water sealant 10 that is to cure.

When the protecting cap 1 is dip molded, as shown in FIGS. 8A and 8B, variation is likely to occur in a thickness (t) of the bottom portion, and even if the height of a required position on the peripheral wall 2 is measured from an outer surface (lower surface) 3a of the bottom portion 3, this does not mean that the height from an inner surface (upper surface) 3b of the bottom portion 3 will be measured accurately.

Accordingly, as shown in FIG. 3A, providing a shallow groove 30v, which is for forming a marking line, as a line in the circumferential direction at a position a predetermined height from a bottom end 30a of a male mold 30, which is used during dip molding, provides a protruding linear rib on the inner surface of the peripheral wall 2 of the molded protecting cap 1, as a marking line 6. The marking line 6 is a transparent line, and thus cannot be visually observed by a worker from the outside at a glance.

A control line 7 that is a non-transparent line is provided over half the circumference of the outer circumferential surface using a laser marker, at a position that opposes the marking line 6 on the inner circumferential side of the peripheral wall 2. The control line 7 provided using a laser marker can be easily and accurately formed by drawing a line, using the marking line 6 on the internal circumference side as a target. The control line 7 is thus accurately drawn on the peripheral wall 2 at 3 mm above the bottom portion inner surface 3b of the bottom portion 3.

If the control line 7 is provided on the peripheral wall 2 at a position that is 3 mm from the bottom portion inner surface 3b, and the lower end of the splice portion 25 is located at or below the control line 7, the entirety of the splice portion 25 and the stripped portion 26 and at least 1 mm of the insulating sheathed portion 27 is guaranteed to be submerged in the water sealant 10. Specifically, a certain amount of the water sealant 10 in a melted state is filled into the protecting cap 1 in advance. The set-up is such that, if the splice portion 25 of the wire harness, the stripped portion 26, and the insulating sheathed portion 27 are inserted into the protecting cap 1 via the opening 4 and submerged in the water sealant 10 in the protecting cap 1, then the filled-in water sealant 10 rises to a position that submerges at least 1 mm of the insulating sheathed portion 27.

Thus, when the lower end of the splice portion 25 is located at or below the control line 7, the product is deemed to be a suitable product in which the required region is submerged in the water sealant 10. On the other hand, when a lower end 25s of the splice portion 25 is above the control line 7, the product is deemed to be a defective product in which not at least 1 mm of the insulating sheathed portion 27 of the electrical lines is submerged in the water sealant 10.

Also, an enlarged diameter portion 30c that inclines upward is provided in the outer circumference of the upper portion of the male mold 30 used during dip forming. Accordingly, the region Z2 on the opening 4 side of the protecting cap 1 is made to be the enlarged diameter portion 5 that widens towards the upper end where the opening 4 is located. The widening angle of the enlarged diameter portion 5 is set to 3 to 6 degrees, and is set to 5 degrees in the present embodiment. A gap C is provided between the enlarged diameter portion 5 and the outer circumference of the inserted wire harness by providing the enlarged diameter portion 5, and rising of the melted water sealant 10 from below through the gap C due to capillary action and spilling out from the opening 4 can be prevented.

The length and diameter of the protecting cap 1 are different depending on the size of the splice portion of the inserted wire harness, but the protecting cap 1 of the present embodiment has a length of 40 mm from the bottom portion inner surface 3b to the opening 4, an inner diameter of 8 mm, and the peripheral wall 2 has a thickness of 1 mm.

Also, the molding material of the protecting cap 1 is not limited to resin, but in the present embodiment, dip forming is performed using vinyl chloride. The water sealant 10 is not limited to that of the present embodiment, and a two liquid reactive curing type epoxy resin that has the benefit of a high curing speed is used in the present embodiment, but because it is colorless, it is hard to visually confirm the filling position in a colorless and transparent protecting cap 1 from the outside.

If the protecting cap 1 configured as described above is used, first, as shown in FIG. 4A, the protecting cap 1 is held standing upright, and a certain amount of the melted water sealant 10 is poured in via the opening 4 in the upper end. The amount of the water sealant 10 to be poured in, in a state where the splice portion 25 of the wire harness, the stripped portion 26, and the insulating sheathed portion 27 have been inserted, is set as an amount that only rises to a position that is distanced from the opening 4 of the protecting cap 1 by a required height.

Incidentally, as shown in FIG. 4, the splice portion 25, the stripped portion 26, and the insulating sheathed portion 27 are inserted via the opening 4 of the protecting cap 1 with the tip of the splice portion 25 of the wire harness acting as a lower surface. Due to this insertion, the melted water sealant 10 that has been filled in in advance fills in the area between the outer circumference of the splice portion 25 and the inner surface of the peripheral wall 2, gaps between the stripped portion 26 and the insulating sheathed portion 27 of the plurality of electrical lines, and the area between the stripped portion 26 and the insulating sheathed portion 27 and the inner surface of the peripheral wall 2, while the liquid surface of the water sealant 10 rises. Particularly, when the gap between the outer circumferential surface of the splice portion 25, the stripped portion 26, and the insulating sheathed portion 27 and the inner circumferential surface of the peripheral wall 2 is minute, the water sealant 10 rises up along the inner surface of the peripheral wall 2 due to capillary action, but the gap C widens at the enlarged diameter portion 5, and therefore rising up of the water sealant 10 due to capillary action is stopped, and spilling out from the opening 4 is prevented.

As shown in FIG. 4C, once a state has been achieved in which the splice portion 25 of the wire harness, the stripped portion 26, and the insulating sheathed portion 27 are submerged in the cured water sealant 10 in the protecting cap 1, a worker performs a visual observation and examination from the outside, and the product is eliminated if it is defective.

As described above, the visual observation and examination is product control in which the lower end of the splice portion 25 is examined using the control line 7 as a boundary line, and if the lower end of the splice portion 25 is located at or below the control line 7, the product is deemed as being suitable, and if the lower end of the splice portion 25 is located above the control line 7, the product is deemed as being defective.

When visual observation and examination is being performed, the control line 7 and the splice portion 25 are non-transparent, in contrast to the colorless and transparent protecting cap 1 and the water sealant 10, and therefore determination can be easily and accurately performed through visual observation from the outside.

Also, because the enlarged diameter portion 5 is provided at the opening 4 side of the protecting cap 1, liquid leakage of the water sealant 10 due to capillary action can be prevented.

The present invention is not limited to the embodiment described above, and in a protecting cap 1-2 shown in FIG. 5A, the control line 7 has been provided, but the shape from the opening 4 to the bottom portion 3 is a straight tube, and no enlarged diameter portion is provided in the opening side.

Also, a protecting cap 1-3 shown in FIG. 5B is an injection molded product, and the thickness of the bottom portion 3 is constant, and thus no control line 7 is provided, but the enlarged diameter portion 5 is provided on the opening 4 side.

Furthermore, even if the water sealant that is filled into the protecting cap is non-transparent or is semi-transparent, providing a control line is useful for determining a suitable product or a defective product at a glance.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

REFERENCE SIGNS LIST

1 Protecting cap
2 Peripheral wall
3 Bottom portion
3a Outer surface of bottom portion
3b Inner surface of bottom portion
4 Opening
5 Enlarged diameter portion
6 Marking line
7 Control line
10 Water sealant
20 Wire harness
25 Terminal consolidation splice portion
26 Stripped portion
27 Insulating sheathed portion
30 Male mold

The invention claimed is:

1. A protecting cap for a terminal consolidation splice, the protecting cap being a dip molded transparent tubular body that is provided with a bottom portion at one end of the tubular body in a length direction thereof, wherein, from an opening for insertion at the other end, the protecting cap can be filled with a water sealant and a terminal consolidation splice portion of a wire harness is insertable, wherein a marking line made by a rib on a male mold used in the dip molding is provided in a circumferential direction on an inner circumferential surface of a peripheral wall and is distanced by a required height from an inner surface of the bottom portion toward the opening, and a non-transparent line is provided on an outer circumferential surface of the peripheral wall following the marking line, the non-transparent line serving as a control line for a lower end position of the consolidation splice portion.

2. The protecting cap for a terminal consolidation splice according to claim 1, wherein the water sealant that is to be filled into the protecting cap is colorless and transparent.

3. The protecting cap for a terminal consolidation splice according to claim 1, wherein the non-transparent control line provided on the outer circumferential surface of the peripheral wall is marked by a laser marker or ink as a line that goes entirely or partially around the outer circumferential surface of the peripheral wall at a position that is 2.5 mm to 3.5 mm from the inner surface of the bottom portion.

4. A protecting cap for a terminal consolidation splice, the protecting cap being a resin molded tubular body that is provided with a bottom portion at one end of the tubular body in a length direction thereof, wherein, from an opening for insertion at the other end, the protecting cap can be filled with a water sealant and a terminal consolidation splice portion of a wire harness is insertable, wherein a peripheral wall extends straight in the length direction from the bottom portion to a vicinity of the opening, and an enlarged diameter portion that widens to incline in a range of 3 to 6 degrees toward the opening in the peripheral wall is provided in the vicinity of the opening, a gap being formed between an inner surface of the enlarged diameter portion and an outer circumferential surface of an insulating sheathed portion of the wire harness, to prevent the water sealant from reaching the opening due to capillary action.

5. The protecting cap for a terminal consolidation splice according to claim 4, wherein the enlarged diameter portion provided in a vicinity of the opening of the protecting cap is provided over a range of 5% to 15% of the entire length of the protecting cap from the opening.

* * * * *